J. E. MOELLER.
Evaporator.
No. 51,206.
Patented Nov. 28, 1865.
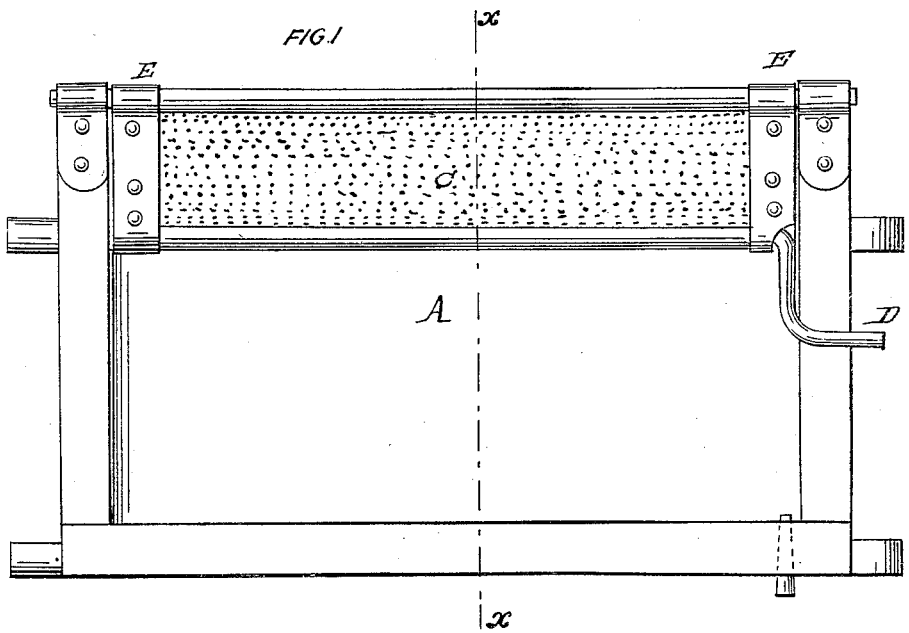
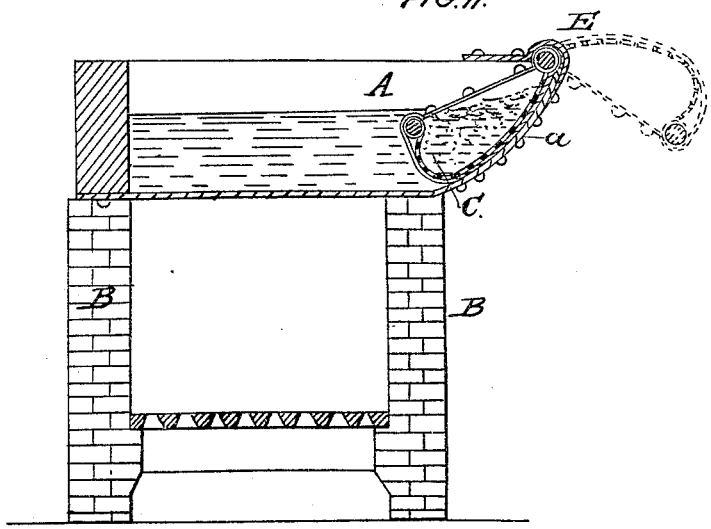
WITNESSES
Edward H. Knight
Charles D. Smith
INVENTOR
Jacob E. Moeller

UNITED STATES PATENT OFFICE.

JACOB E. MOELLER, OF TERRE HAUTE, INDIANA.

IMPROVED EVAPORATOR.

Specification forming part of Letters Patent No. 51,206, dated November 28, 1865.

*To all whom it may concern:*

Be it known that I, JACOB E. MOELLER, of Terre Haute, in the county of Vigo and State of Indiana, have made new and useful Improvements in Evaporators; and I do hereby declare the following to be a full, clear, and exact description of the nature, construction, and operation of the same, sufficient to enable one skilled in the branch of industry to which it appertains to construct and use the same, reference being had to the accompanying drawings, which are made part of this specification, and in which—

Figure 1 is a plan or top view. Fig. 2 is a transverse vertical view on the line $xx$, Fig. 1.

The same letters refer to corresponding parts in the two figures.

The invention consists of a hinged and perforated tray on the shallow and cooler side of the evaporating-pan, for the purpose of removing the scum from the boiling liquid.

A is the pan, and B the walls of the furnace, over which the pan is placed. The latter is shallow on one of its sides, $a$, which projects beyond and outside of the furnace.

Hinged to the edge of the shallow side of the pan is a tray, C, made of perforated metal, and occupying such a position in the pan that the scum, which, in the operation of boiling, gathers to the coolest side of the pan, is collected in the tray, which, by being elevated above the saccharine solution, allows the escape of the latter through its orifices back into the pan, retaining the scum and feculent matter, which is afterward discharged by the rotation of the tray on its hinge, it assuming the position shown in red lines in Fig. 2.

The tray is manipulated by the handle D, and rotates upon the hinge E.

This apparatus is intended for the boiling of sorghum-juice or other saccharine solutions containing mucilaginous, albuminous, and other feculent matters.

Having described my invention, what I claim as new, and desire to secure by Letters Patent, is—

The hinged and perforated tray so attached to the cool side of the pan and hanging within it as to collect the feculent matters, which, by the rotation of the tray, are drained and subsequently discharged, substantially as described and represented.

To the above specification of my improvement in evaporators I have signed my hand this 18th day of August, 1865.

JACOB E. MOELLER.

Witnesses:
 CHARLES D. SMITH,
 ALEXR. A. C. KLAUCKE.